No. 669,893. Patented Mar. 12, 1901.
A. BOHLEEN.
CELERY DIGGER.
(Application filed Nov. 19, 1900.)
(No Model.)
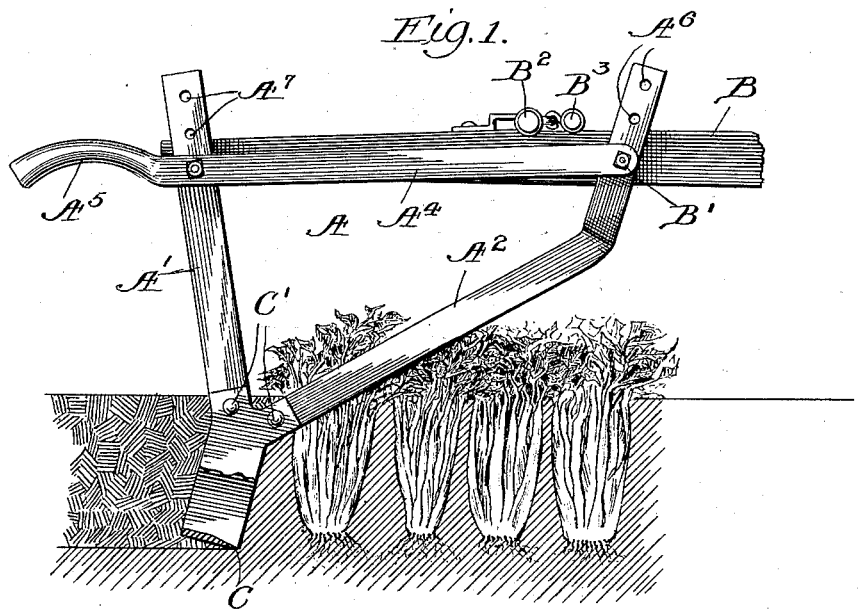
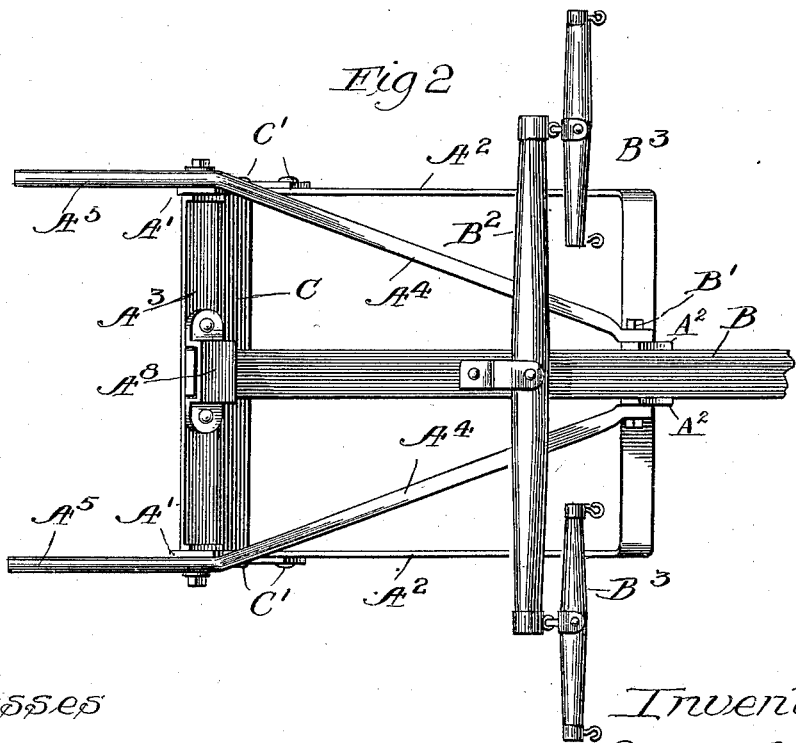
Witnesses
G. A. Paubenschmidt
Geo. L. Chindahl
Inventor
August Bohleen
By Luther L. Miller
Atty
THE NORRIS PETERS CO., PHOTO-LITHO., WASHINGTON, D. C.

UNITED STATES PATENT OFFICE.

AUGUST BOHLEEN, OF CHICAGO, ILLINOIS.

CELERY-DIGGER.

SPECIFICATION forming part of Letters Patent No. 669,893, dated March 12, 1901.

Application filed November 19, 1900. Serial No. 37,074. (No model.)

*To all whom it may concern:*

Be it known that I, AUGUST BOHLEEN, a citizen of the United States, residing at Chicago, in the county of Cook and State of Illinois, have invented certain new and useful Improvements in Celery-Diggers, of which the following is a specification.

In preparing celery for the market it first is necessary to remove the plant from the ground, and this is done by digging each plant separately from the hill, an operation both slow and laborious.

The object of this invention is the production of a horse-drawn implement adapted to sever the stalks of celery-plants from their roots and to leave the celery free to be pulled from the ground, thus dispensing with the necessity of digging each plant separately.

In the accompanying drawings, Figure 1 is a side elevation of a celery-digger embodying the features of my invention. Fig. 2 is a plan view of the same.

Like letters of reference indicate corresponding parts throughout both views.

In the production of this implement I provide a framework A, comprising two rear braces $A'$, two forward braces $A^2$, a cross-bar $A^3$, extending between the upper ends of said rear braces, and two diagonal brace-bars $A^4$, extending from the upper ends of the forward braces rearward to the upper ends of the rear braces, each terminating in a handle $A^5$ rearward of said rear braces. The forward braces near their upper ends are bent inward and then again upward and are provided with a series of holes $A^6$ for permitting an adjustment of the point of attachment of said forward braces to the pole, to be later described. The rear braces are each provided with a similar series of adjustment-holes $A^7$.

$A^8$ is a loop fixed to the cross-bar $A^3$.

B is a draft-pole, its rear end being confined within the loop $A^8$ of the cross-bar $A^3$, said pole extending forward between the upper ends of the forward braces $A^2$. A bolt $B'$, passing through a suitable opening in the pole B, secures the diagonal brace-bars $A^4$ and the forward braces $A^2$ to each side of said pole. A doubletree $B^2$, with the usual singletree $B^3$, is suitably mounted upon the pole B.

C is a cutter-bar having a sharp forward edge, and also having its ends upturned and secured in any suitable manner, as by the rivets $C'$, to the lower ends of the forward and the rear braces, the cutter-bar C being fixed in its connection with said braces.

In operation horses are attached to the digger and the latter sunk into the soil in somewhat the same manner as a plow is started until the cutter-bar is on a level with or a little lower than the bottoms of the celery-stalks. As these stalks are set in the ground when the plants are small and as they grow upward, their lower ends will be substantially in a horizontal plane. The horses, one walking on each side of the row of celery-plants, are driven lengthwise of said row, and the cutter-bar C is thus caused to sever the stalks of celery in the row from their roots, leaving said stalks free to be pulled from the hills. The degree of slant or "suction" given to the cutter-bar C may be varied by changing the point of attachment of the rear braces with the brace-bars and the forward braces with the pole B by means of the series of openings $A^7$ and $A^6$, respectively.

The implement is manipulated by its handles in much the same manner as a plow. When it is started on a row of celery, the operator walks on one side and holds one handle to steady it.

I claim as my invention—

1. In a celery-digger, in combination, a cutter-bar; a pair of rear braces fixed with relation to said cutter-bar; a pair of forward braces also fixed with relation to said cutter-bar; a cross-bar secured between said rear braces; a draft-pole fixed to said cross-bar and extending forward and being attached to the upper ends of said forward braces; and means for adjustably securing the rear braces with relation to the cross-bar, whereby the angle of inclination of the cutter-bar may be changed.

2. In a celery-digger, in combination, a cutter-bar; a pair of rear braces fixed with relation to said cutter-bar; a pair of forward braces also fixed with relation to said cutter-bar; a cross-bar secured between said rear braces; a draft-pole fixed to said cross-bar and extending forward therefrom and being attached to the upper ends of said forward braces; and means for adjustably securing the upper ends of the forward braces to the draft-pole, whereby the angle of inclination of the cutter-bar may be changed.

3. In a celery-digger, in combination, a cutter-bar; a pair of rear braces fixed with relation to said cutter-bar; a pair of forward braces also fixed with relation to said cutter-bar; a cross-bar secured between said rear braces; a draft-pole fixed to said cross-bar and extending forward therefrom; and means for adjustably securing the rear braces with relation to the cross-bar, also means for adjustably securing the forward braces to the draft-pole, whereby the angle of inclination of the cutter-bar may be changed.

AUGUST BOHLEEN.

Witnesses:
  L. L. MILLER,
  GEO. L. CHINDAHL.